United States Patent [19]

Siddall

[11] 3,728,372
[45] Apr. 17, 1973

[54] CHRYSANTHEMIC ACID PREPARATION
[75] Inventor: John B. Siddall, Palo Alto, Calif.
[73] Assignee: Zoecon Corporation, Palo Alto, Calif.
[22] Filed: Jan. 18, 1971
[21] Appl. No.: 107,429

[52] U.S. Cl. ........260/456 R, 260/468 P, 260/514 B, 260/586 R, 260/617 F
[51] Int. Cl. ............................................C07c 143/68
[58] Field of Search.......................260/456 R, 456 P

[56] References Cited

OTHER PUBLICATIONS

Chemical Abstracts, Vol. 57, 13639i.
Tetrahedron Letters, No. 51, pp. 5,193–5,196 (1967), W. Reusch et al.

Primary Examiner—Leon Zitver
Assistant Examiner—Leo B. De Crescente
Attorney—Donald W. Erickson

[57] ABSTRACT

Syntheses of chrysanthemic acid and esters involving reduction of 3,3,6,6-tetramethylbicyclo [3.1.0] hexane-2,4-dione, esterification to a sulfonic acid ester, and ring cleavage.

3 Claims, No Drawings

CHRYSANTHEMIC ACID PREPARATION

This invention relates to novel syntheses of chrysanthemic acid and esters of chrysanthemic acid.

Syntheses of chrysanthemic acid have been described previously in, for example, U.S. Pat. Nos. 2,815,362, 3,046,299, 3,077,496, 3,123,629, 3,282,984, 3,354,196, 3,445,499, 3,527,769 and 3,538,143. Prior art syntheses are disadvantageous due to the unavailability and expense of starting materials and low yields. The syntheses of the present invention overcomes these disadvantages of the prior art.

One embodiment of the present invention is outlined as follows:

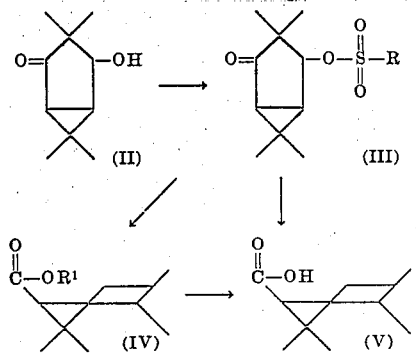

R is methyl or tolyl and $R^1$ is lower alkyl of one to six carbon atoms. In the practice of the above process, 2-hydroxy-3,3,6,6-tetramethylbicyclo [3.1.0] hexan-4-one is converted into the corresponding mesylate or tosylate III using methanesulfonylchloride or p-toluenesulfonyl chloride in triethylamine or pyridine. A compound of formula III is reacted with alkali metal alkoxide (the alkoxy containing one to six carbon atoms) such as sodium methoxide, sodium ethoxide, potassium methoxide and potassium ethoxide to yield the lower alkyl chrysanthemate IV which is hydrolyzed to the chrysanthemic acid V. The preparation of the chrysanthemate IV is carried out in an organic solvent such as dimethylsulfoxide or tetrahydrofuran at a temperature of from about 25° to 75° C. The reaction is usually complete in from about 6 to 30 hours. By reacting the mesylate or tosylate III with strong base in aqueous organic solvent, chrysanthemic acid (V) is obtained directly. This reaction can be carried out using, for example, sodium hydroxide or potassium hydroxide in the presence of water in an organic solvent such as dioxane, diglyme, monoglyme, tetrahydrofuran, and the like. The reaction is generally carried out at above room temperature to the reflux temperature of the reaction mixture and is complete within minutes to several hours.

Another embodiment of the present invention is outlined as follows:

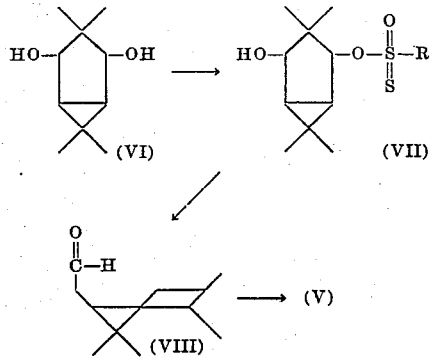

In the practice of the above process, the diol VI is converted into the 4-mesylate or 4-tosylate VII using methanesulfonyl chloride or p-toluenesulfonyl chloride in triethylamine or pyridine. The compound of formula VII is then reacted with alkali metal hydride such as sodium hydride or potassium hydride or an alkali metal alkoxide such as potassium t-butoxide in an organic solvent such as tetrahydrofuran, dioxane, diglyme, and the like to yield the aldehyde VIII. The reaction is generally done at about room temperature, although temperatures below and above room temperature can be used and is complete within minutes to a few hours. The aldehyde is then oxidized using manganese dioxide or other mild conditions to afford chrysanthemic acid V.

The starting materials II and VI are readily prepared using the procedure outlined below.

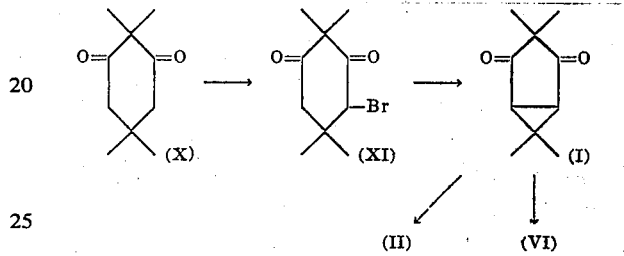

The diketone X is prepared from dimedone using methyliodide and potassium carbonate in acetone and refluxing for several hours. Bromination of X is accomplished using bromine in glacial acetic acid at room temperature for a few minutes. The bromide XI is converted into the bicyclic diketone I using alkali metal hydride such as sodium hydride in tetrahydrofuran or the like. The reaction is complete within minutes to a few hours. Alternatively, the bicyclic diketone I can be prepared by treatment of the bromide XI with alkali metal alkoxide in dimethylformamide. Reduction of the diketone using sodium borohydride or lithium tri-t-butoxy aluminum hydride affords the mono-alcohol II. The diol VI is prepared from the diketone I using lithium aluminum hydride.

The following examples are provided to illustrate the practice of the present invention. Temperature is given in degrees Centigrade.

EXAMPLE 1

To the solution of 14 g. of 3,3,6,6-tetramethylbicyclo [3.1.0] hexane-2,4-dione in 35 ml. of methanol is added a solution of 0.83 g. of sodium borohydride in 35 ml. of methanol at 0°. After warming to 25° and stirring for 2 hours the mixture is poured into ice water, and the aqueous layer extracted with ether. The combined ether extracts are washed with brine, dried over magnesium sulfate, and evaporated in vacuo to yield 2-hydroxy-3,3,6,6,-tetramethylbicyclo [3.1.0] hexan-4-one. The crude product can be purified by column chromatography on silica gel.

EXAMPLE 2

To a cold (0°) solution of 1.4 g. of 2-hydroxy-3,3,6,6-tetramethylbicyclo [3.1.0] hexan-4-one and 1.3 g. of triethylamine in 50 ml. of dichloromethane is added 1.04 g. of methanesulfonyl chloride over a period of 5 minutes. The solution is warmed to 25° and stirred for 2 hours. The mixture is poured into brine, diluted with 150 ml. of ether, washed with saturated potassium bicarbonate and brine. The organic phase is dried over magnesium sulfate and evaporated in vacuo to yield 2-mesyloxy-3,3,6,6-tetramethylbicyclo [3.1.0] hexan-4-one. The product is purified by chromatography on silica gel.

EXAMPLE 3

A solution of 2.2 g. of sodium methoxide in 150 ml. of dimethylsulfoxide and 15 ml. MeOH is added to a solution of 10 g. of 2-mesyloxy-3,3,6,6-tetramethylbicyclo [3.1.0] hexan4-one in 40 ml. of anhydrous dimethylsulfoxide. The solution is heated at 50° for 18 hours, poured into 200 ml. of water, and extracted several times with ether. The combined ether layers are washed several times with brine and dried over magnesium sulfate. The solvent is removed under reduced pressure, yielding cis-methyl chrysanthemate.

EXAMPLE 4

A solution of 10 g. of 2-mesyloxy-3,3,6,6-tetramethylbicyclo [3.1.0] hexan-4-one in 100 ml. of 30 percent aqueous dioxane is treated with a solution of 2.0 g. of sodium hydroxide in 50 ml. of water. The solution is refluxed overnight. After cooling to 25°, the solution is washed twice with ether. The aqueous phase is then acidified with dilute HCl and extracted several times with ether. The combined extracts are washed with brine, dried over magnesium sulfate, and evaporated under reduced pressure to yield cis-chrysanthemic acid as a crystallize solid which is purified by recrystallization.

The product obtained in examples 3 and 4 (predominately cis ester and acid, respectively), can be epimerized by known procedures to the trans isomer. See, for example, U.S. Pat. Nos. 3,046,299 and 3,538,143 and Hanafusa, Chem. and Ind., 1050 (1970).

EXAMPLE 5

A solution of 10 g. of 3,3,6,6-tetramethylbicyclo [3.1.0] hexa-2,4-dione in 50 ml. of ether is added dropwise to a solution of 2 g. of lithium aluminum hydride in 50 ml. of ether. After stirring for 14 hours at 25° under an inert atmosphere, the mixture is cooled in an ice bath and excess reagent hydrolyzed by the slow addition of 2 ml. of water, followed by 2 ml. of 15 percent aqueous sodium hydroxide solution, and 6 ml. of water. The granular precipitates are filtered. The ethereal filtrate is washed twice with brine, dried over magnesium sulfate, and evaporated in vacuo to yield 2,4-dihydroxy-3,3,6,6-tetramethylbicyclo [3.1.0] hexane, which is purified by silica gel chromatography.

EXAMPLE 6

To a cold (0°) solution of 1.4 g. of 2,4-dihydroxy-3,3,6,6-tetramethylbicyclo [3.1.0] hexane and 1.3 g. of triethylamine in 50 ml. of dichloromethane is added 0.95 g. of methanesulfonyl chloride. The solution is stirred at 0° for 2 hours and poured into brine. After dilution with 200 ml. of ether, the organic phase is washed with brine, saturated NaH CO₃, and brine. After drying over magnesium sulfate the solvents are removed under reduced pressure, yielding 2-hydroxy-4-mesyloxy-3,3,6,6-tetramethylbicyclo [3.1.0] hexane. The crude product can be purified by chromatography on silica gel.

EXAMPLE 7

To a suspension of 1 g. of sodium hydride in 20 ml. of tetrahydrofuran is added a solution of 10 g. of 2-hydroxy-4-mesyloxy-3,3,6,6-tetra-methylbicyclo [3.2.0π hexane. The solution is stirred for 2 hrs at 25° and poured into brine. After the addition of 200 ml. of ether, the organic phase is washed twice with brine, dried over magnesium sulfate, and evaporated in vacuo to yield 2,2-dimethyl-3-(2'-methyl-1'-propenyl)-cyclopropane-1-carboxaldehyde.

EXAMPLE 8

To a solution of 1 g. of 2,2-dimethyl-3-(2'-methyl-1-propenyl)-cyclopropane-1-carboxaldehyde in 20 ml. of methanol are added 1.7 g. of sodium cyanide, 0.6 g. of acetic acid, and 12 g. of manganese dioxide. The mixture is stirred for 12 hours at 25° and filtered. The filtrate is evaporated to near dryness, suspended in 20 ml. of water, and extracted several times with ether. The extracts are washed with 5 percent sodium bicarbonate and brine, and dried over magnesium sulftate. Evaporation of the dried extracts yields a mixture of cis- and trans - methyl chrysanthemates, which can be separated by gas chromatography. Isomerization of the mixture to the equilibrium mixture-predominantly trans-can be achieved either thermally or with base.

EXAMPLE 9

A. The diketone of formula X (3.5 g.) is dissolved in 15 ml. of glacial acetic acid by warming to 50°. Bromine (1.15 ml.) is added dropwise and then after cooling to room temperature, the mixture is allowed to stand overnight. Water is added and then after about 2 hours, the mixture is filtered to yield the bromide of formula XI which can be purified by recrystallization from hexane.

B. A 57 percent sodium hydride oil dispersion (4.9 g.) is washed with hexane and suspended in 75 ml. of tetrahydrofuran. A solution of 28 g. of the bromide of formula XI in 60 ml. of tetrahydrofuran is added slowly. The mixture is stirred for 0.5 hour and then poured into brine, diluted with ether and washed twice with saturated brine. The combined organic layers are dried, concentrated and the concentrate distilled to yield 3,3,6,6-tetramethylbicyclo [3.1.0] hexane-2,4-dione (formula I).

C. To a mixture of 5 g. of dimedone, 19.9 g. of potassium carbonate and 50 ml. of acetone is added a solution of 20.5 g. of methyliodide in 20 ml. of acetone and then the mixture is refluxed for 16 hours. Then after standing for 24 hours, the suspension is filtered, filtrate evaporated under reduced pressure and the product (the diketone of formula X) crystallized from ether-hexane.

EXAMPLE 10

A mixture of the diketone of formula X (1.9 g.) and pyridino hydrobromide perbromide (3.62 g.) and 50 ml. of glacial acetic acid is stirred for 0.5 hour and then refluxed for about 10 minutes. The mixture is cooled, diluted with water and allowed to stand. The crystalline product of formula XI is recovered by filtration and recrystallized from hexane.

What is claimed is:

1. A compound of the formula:

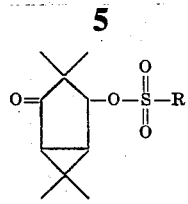
wherein R is methyl or tolyl.
2. A compound according to claim 1 wherein R is methyl.
3. A compound according to claim 1 wherein R is tolyl.
* * * * *